(12) United States Patent
Karczewicz et al.

(10) Patent No.: US 10,194,158 B2
(45) Date of Patent: Jan. 29, 2019

(54) TRANSFORM BASIS ADJUSTMENT IN SCALABLE VIDEO CODING

(71) Applicant: QUALCOMM Incorporated, San Diego, CA (US)

(72) Inventors: Marta Karczewicz, San Diego, CA (US); Liwei Guo, San Diego, CA (US); Joel Sole Rojals, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 547 days.

(21) Appl. No.: 14/014,016

(22) Filed: Aug. 29, 2013

(65) Prior Publication Data

US 2014/0064361 A1 Mar. 6, 2014

Related U.S. Application Data

(60) Provisional application No. 61/696,713, filed on Sep. 4, 2012.

(51) Int. Cl.
*H04N 19/30* (2014.01)
*H04N 19/176* (2014.01)
(Continued)

(52) U.S. Cl.
CPC ............ *H04N 19/30* (2014.11); *H04N 19/12* (2014.11); *H04N 19/157* (2014.11); *H04N 19/176* (2014.11); *H04N 19/46* (2014.11)

(58) Field of Classification Search
None
See application file for complete search history.

(56) References Cited

U.S. PATENT DOCUMENTS 6,134,270 A * 10/2000 Mou ................. G06T 9/007
375/240.21
8,644,382 B2 * 2/2014 Tsukuba ............. H04N 19/159
375/240.12
(Continued)

FOREIGN PATENT DOCUMENTS

CN 1120773 A 4/1996
CN 101466040 A 6/2009
(Continued)

OTHER PUBLICATIONS

Wallendael et al. "Transform skipping dependent on block parameters," 7, JCT-VC Meeting; 98, MPEG Meeting Nov. 21, 2011-Nov. 20, 2011; Geneva; (Joint Collaborative Team on Video Coding of ISO/IEC JTC1/SC29/WG11 and ITU-T SG. 16; No. JCTVC-G577, Nov. 8, 2011 (Nov. 8, 2011), XP030110561.*
(Continued)

*Primary Examiner* — William C Vaughn, Jr.
*Assistant Examiner* — Stuart D Bennett
(74) *Attorney, Agent, or Firm* — Knobbe, Martens, Olson & Bear, LLP

(57) ABSTRACT

An apparatus for coding video information according to certain aspects includes a memory unit and a processor in communication with the memory unit. The memory unit stores video information associated with a reference layer and a corresponding enhancement layer. The processor obtains residue block information based at least in part on video information associated with the reference layer and the enhancement layer. The processor determines an adjustment transform function based on a transform function associated with the video information. The processor determines a transform block based on the adjusted transform function and the residue block information.

39 Claims, 6 Drawing Sheets

(51) Int. Cl.
H04N 19/12 (2014.01)
H04N 19/157 (2014.01)
H04N 19/46 (2014.01)

(56) References Cited

U.S. PATENT DOCUMENTS

| | | | | |
|---|---|---|---|---|
| 2006/0239576 | A1* | 10/2006 | Mukherjee | H04N 19/176 382/248 |
| 2007/0291836 | A1 | 12/2007 | Shi et al. | |
| 2009/0175338 | A1 | 7/2009 | Segall | |
| 2010/0208802 | A1 | 8/2010 | Tsukuba et al. | |
| 2011/0044551 | A1* | 2/2011 | Lee | H04N 19/105 382/238 |
| 2012/0219060 | A1 | 8/2012 | Chen et al. | |
| 2013/0003855 | A1* | 1/2013 | Park | H04N 19/119 375/240.18 |
| 2013/0051472 | A1 | 2/2013 | Wiegand et al. | |
| 2013/0188730 | A1* | 7/2013 | Hong | H04N 19/625 375/240.18 |
| 2013/0343448 | A1* | 12/2013 | He | H04N 19/176 375/240.03 |

FOREIGN PATENT DOCUMENTS

| | | | |
|---|---|---|---|
| CN | 101601300 A | 12/2009 | |
| CN | 101690235 A | 3/2010 | |
| EP | 0692913 A2 | 1/1996 | |
| JP | H0884081 A | 3/1996 | |
| JP | 2010512698 A | 4/2010 | |
| JP | WO 2012096194 A1 * | 7/2012 | H04N 19/593 |
| WO | WO-2008063687 A2 | 5/2008 | |
| WO | WO-2008071036 A1 | 6/2008 | |
| WO | WO-2012096164 A1 * | 7/2012 | H04N 19/597 |
| WO | WO-2012096194 A1 | 7/2012 | |
| WO | 2012167711 A1 | 12/2012 | |
| WO | 2013106887 A1 | 7/2013 | |

OTHER PUBLICATIONS

An J., et al., "Residue scan for intra transform skip mode", 18. JCT-VC Meeting; 181. MPEG Meeting; 11-7-2812-28-7-2812; Stockholm; (Joint Collaborative Team on Video Cooing of ISO/IEC JTC1/SC29/WG11 AM) ITU-T SG.16); URL: http://wftp3.ittj.int/av-arch/jctvc-site/, No. JCTVC-J0053, Jul. 1, 2012 (Jul. 1, 2012), XP030112415; pp. 1-5.

Van Der Auwera G., et al., "Intra Transform Skipping: Smallest CU and Implicit Chroma", 10. JCT-VC Meeting, 101. MPEG Meeting; Jul. 11, 2012-Jul. 20, 2012; Stockholm; (Joint Colloborative Team on Video Coding of ISO/IEC JTC1/SC29/WG11 and ITU-T SG.16), No. JCTVC-J0265, Jul. 3, 2012 (Jul. 3, 2012), XP030112627, pp. 1-11.

International Search Report and Written Opinion—PCT/US2013/057618—ISA/EPO—dated Oct. 25, 2013.

Joshi, R., et al., "AHG19: Modification to HE transform coefficient coding for transform skip mode", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-G663, Nov. 9, 2011 (Nov. 9, 2011), XP030110647; pp. 1-3, the whole document.

Mrak M., et al., "Improving screen content coding in HEVC by transform skipping", Signal Processing Conference (EUSIPCO), 2012 Proceedings of the 20th European, IEEE, Aug. 27, 2012 (Aug. 27, 2012), p. 1209-1213, XP032254679, ISBN: 978-1-4673-1068-0.

Mrak M., et al., "Transform skip mode", 97. MPEG Meeting; Jul. 18, 2011-Jul. 22, 2011; Torino; (Motion Picture Expert Group or ISO/IEC JTC1/SC29/WG11), No. m20489, Jul. 15, 2011 (Jul. 15, 2011), XP030049053; pp. 1-9.

Mrak, M., et al., "Transform skip mode", $7^{th}$ JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/ No. JCTVC-G575, Nov. 8, 2011, XP030110559; pp. 1-13.

Skupin R., et al., "AHG9/AHG10: Design of the Video Parameter Set", 10. JCT-VC Meeting; 101. MPEG Meeting; Jul. 11, 2012-Jul. 20, 2012; Stockholm; (Joint Collaborative Team on Video Cooing of ISO/IEC JTC1/SC29/WG11 and ITU-T SG.16); URL: http://wftp3.itujnt/av-arch/jctvc-site/,, No. JCTVC-J0257, Jul. 2, 2012 (Jul. 2, 2012), XP030112619; pp. 1-9.

Van Wallendael G.V., et al., "Transform skipping dependent on block parameters", 7. JCT-VC Meeting; 98. MPEG Meeting; Nov. 21, 2011-Nov. 30, 2011; Geneva; (Joint Collaborative Team on Video Cooing of ISO/IEC JTC1/SC29/WG11 and ITU-T SG.16) ; URL: http://wftp3.itu.int/av-arch/jctvc-site/, No. JCTVC-G577. Nov. 8, 2011 (Nov. 8, 2011). XP030110561; pp. 1-11.

Rath G et al., "Improved prediction and transform for spatial scalability", 20. JVT Meeting; 77. MPEG Meeting; Klagenfurt, AT; (Joint Video Team of ISO/IEC JTC1/SC29/WG11 and ITU-TSG.16 ), No. JVT-T082, Jul. 16, 2006 (Jul. 16, 2006), XP030006569; pp. 1-4.

Saxena A. et al., "On secondary transforms for intra/inter prediction residual", 100. MPEG Meeting; Apr. 30, 2012-Apr. 5, 2012; Geneva; (Motion Picture Expert Group or ISO/IEC JTC1/SC29/WG11), No. m24474, Apr. 28, 2012 (Apr. 28, 2012), XP030052817; pp. 1-15.

Martin A., et al., "Phase Refinement for Image Prediction based on Sparse Representation", Visual Information Processing and Communication, vol. 7543, 75430H, Jan. 2010, 8 Pages.

* cited by examiner

TRANSFORM BASIS ADJUSTMENT IN SCALABLE VIDEO CODING

CROSS-REFERENCE TO RELATED APPLICATIONS

This application claims priority to U.S. Provisional No. 61/696,713, filed Sep. 4, 2012, which is incorporated by reference in its entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

SUMMARY

In general, this disclosure describes techniques related to improving coding performance by conditionally or adaptively adjusting a transform function during scalable video coding.

The details of one or more examples are set forth in the accompanying drawings and the description below. Other features, objects, and advantages will be apparent from the description and drawings, and from the claims.

In one embodiment, an apparatus configured to code video information includes a memory unit and a processor. The memory unit is configured to store video information associated with a reference layer and a corresponding enhancement layer. The processor is in communication with the memory unit. The processor is configured to obtain residue block information based at least in part on video information associated with the reference layer and the enhancement layer. The processor is also configured to determine an adjusted transform function based on a transform function associated with the video information. The processor is also configured to determine a transform block based on the adjusted transform function and the residue block information.

In another embodiment, a method of decoding video information includes storing video information associated with a reference layer and a corresponding enhancement layer. The method also includes obtaining residue block information based at least in part on video information associated with the reference layer and the enhancement layer. The method also includes determining an adjusted transform function based on a transform function associated with the video information. The method also includes determining a transform block based on the adjusted transform function and the residue block information. The method also includes decoding the video information using the transform block.

In another embodiment, a method of encoding video information is provided. The method includes storing video information associated with a reference layer and a corresponding enhancement layer. The method also includes obtaining residue block information based at least in part on video information associated with the reference layer and the enhancement layer. The method also includes determining an adjusted transform function based on a transform function associated with the video information. The method also includes determining a transform block based on the adjusted transform function and the residue block information. The method also includes encoding the video information using the transform block.

In yet another embodiment, an apparatus for coding video information is provided. The apparatus includes means for storing video information associated with a reference layer and a corresponding enhancement layer. The apparatus also includes means for obtaining residue block information based at least in part on video information associated with the reference layer and the enhancement layer. The apparatus also includes means for determining an adjusted transform function based on a transform function associated with the video information. The apparatus also includes means for determining a transform block based on the adjusted transform function and the residue block information.

In yet another embodiment, a computer readable medium has computer executable instructions that when executed by a computing device cause the computing device to store video information associated with a reference layer and a corresponding enhancement layer. The instruction also cause the computing device to obtain residue block information based at least in part on video information associated with the reference layer and the enhancement layer. The instruction also cause the computing device to determine an adjusted transform function based on a transform function associated with the video information. The instruction also cause the computing device to determine a transform block based on the adjusted transform function and the residue block information.

DETAILED DESCRIPTION

Figure 1:
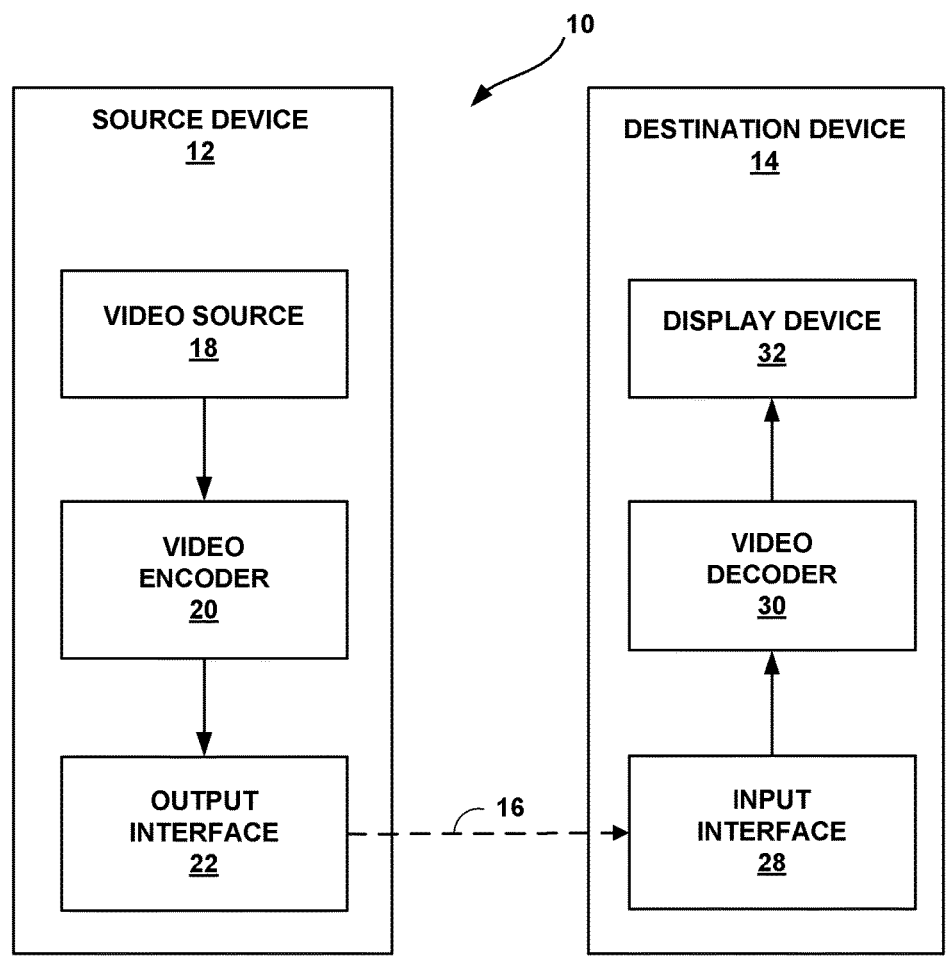
FIG. 1 is a block diagram illustrating an example video encoding and decoding system that may utilize techniques in accordance with aspects described in this disclosure.

The techniques described in this disclosure generally relate to scalable video coding (SVC) and 3D video coding. For example, the techniques may be related to, and used with or within, a High Efficiency Video Coding (HEVC) scalable video coding (SVC) extension. In an SVC extension, there could be multiple layers of video information. The layer at the very bottom level may serve as a base layer (BL), and the layer at the very top may serve as an enhanced layer (EL). The "enhanced layer" is sometimes referred to as an "enhancement layer," and these terms may be used interchangeably. All layers in the middle may serve as either or both ELs or BLs. For example, a layer in the middle may be an EL for the layers below it, such as the base layer or any intervening enhancement layers, and at the same time serve as a BL for the enhancement layers above it.

In video coding in which no interlayer prediction is utilized, DC and low frequency (LF) components tend to have the most residue energy after transform. This property (that DC/LF components tend to have large amplitude while HF components tend to have low amplitude) has been exploited in certain video coding process to achieve compression efficiency. However, the residue of scalable video coding can have different distribution properties due to inter-layer prediction (e.g., due to prediction in Intra BL mode, described below). In particular, with SVC, the residue is more noise-like, and the energy can spread over the whole or a larger frequency domain. Indeed, unlike non-SVC video coding, with SVC, it is possible that HF components can have more energy than DC or LF components. Therefore, the traditional methods used for regular, non-SVC video coding may not work well for scalable video coding. A transform basis adjustment can help improve compression efficiency when implementing SVC. Such techniques are described in greater detail, below. In addition, these techniques may be implemented by an encoder (e.g., as described with respect to FIGS. 1 and 2, below) and/or by a decoder (e.g., as described with respect to FIGS. 1 and 3, below.

For purposes of illustration only, the techniques described in the disclosure are described with examples including only two layers (e.g., lower level layer such as the base layer, and a higher level layer such as the enhanced layer). It should be understood that the examples described in this disclosure can be extended to examples with multiple base layers and enhancement layers as well.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). A recent draft of HEVC is available from http://wg11.sc29.org/jct/doc_end_user/current_document.php-?id=5885/JCTVC-I1003-v2, as of Jun. 7, 2012. Another recent draft of the HEVC standard, referred to as "HEVC Working Draft 7" is downloadable from http://phenix.it-sudparis.eu/jct/doc_end_user/documents/9_Geneva/wg11/JCTVC-I1003-v3. zip, as of Jun. 7, 2012. The full citation for the HEVC Working Draft 7 is document HCTVC-I1003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, $9^{th}$ Meeting: Geneva, Switzerland, Apr. 27, 2012 to May 7, 2012. Each of these references is incorporated by reference in its entirety.

Scalable video coding (SVC) may be used to provide quality (also referred to as signal-to-noise (SNR)) scalability, spatial scalability and/or temporal scalability. An enhanced layer may have different spatial resolution than base layer. For example, the spatial aspect ratio between EL and BL can be 1.0, 1.5, 2.0 or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. In this way, it may be possible, although not a limitation, that the spatial resolution of the EL is larger than the spatial resolution of the BL.

In SVC extension for H.264, prediction of a current block may be performed using the different layers that are provided for SVC. Such prediction may be referred to as inter-layer prediction. Inter-layer prediction methods may be utilized in SVC in order to reduce inter-layer redundancy. Some examples of inter-layer prediction may include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion of the base layer to predict motion in the enhancement layer. Inter-layer residual prediction uses the residue of the base layer to predict the residue of the enhancement layer.

In inter-layer residual prediction, the residue of the base layer may be used to predict the current block in the enhancement layer. The residue may be defined as the difference between the temporal prediction for a video unit and the source video unit. In residual prediction, the residue of the base layer is also considered in predicting the current block. For example, the current block may be reconstructed using the residue from the enhancement layer, the temporal prediction from the enhancement layer, and the residue from the base layer. The current block may be reconstructed according to the following equation:

$$\hat{I}_e = r_e + P_e + r_b \quad (1)$$

where $\hat{I}_e$ denotes the reconstruction of the current block, $r_e$ denotes the residue from the enhancement layer, $P_e$ denotes the temporal prediction from the enhancement layer, and $r_b$ denotes the residue prediction from the base layer.

In order to use inter-layer residual prediction for a macroblock (MB) in the enhancement layer, the co-located macroblock in the base layer should be an inter MB, and the residue of the co-located base layer macroblock may be upsampled according to the spatial resolution ratio of the enhancement layer (e.g., because the layers in SVC may have different spatial resolutions). In inter-layer residual prediction, the difference between the residue of the enhancement layer and the residue of the upsampled base layer may be coded in the bitstream. The residue of the base layer may be normalized based on the ratio between quantization steps of base and enhancement layers.

SVC extension to H.264 requires single-loop decoding for motion compensation in order to maintain low complexity for the decoder. In general, motion compensation is performed by adding the temporal prediction and the residue for the current block as follows:

$$\hat{I} = r + P \quad (2)$$

where $\hat{I}$ denotes the current frame, r denotes the residue, and P denotes the temporal prediction. In single-loop decoding, each supported layer in SVC can be decoded with a single motion compensation loop. In order to achieve this, all layers that are used to inter-layer intra predict higher layers are coded using constrained intra-prediction. In constrained intra prediction, intra mode MBs are intra-coded without referring to any samples from neighboring inter-coded MBs. On the other hand, HEVC allows multi-loop decoding for SVC, in which an SVC layer may be decoded using multiple motion compensation loops. For example, the base layer is fully decoded first, and then the enhancement layer is decoded.

Residual prediction formulated in Equation (1) may be an efficient technique in H.264 SVC extension. However, its performance can be further improved in HEVC SVC extension, especially when multi-loop decoding is used in HEVC SVC extension.

In the case of multi-loop decoding, difference domain motion compensation may be used in place of residual prediction. In SVC, an enhancement layer may be coded using pixel domain coding or difference domain coding. In pixel domain coding, the input pixels for an enhancement layer pixels may be coded, as for a non-SVC HEVC layer. On the other hand, in difference domain coding, difference values for an enhancement layer may be coded. The difference values may be the difference between the input pixels for the enhancement layer and the corresponding scaled base layer reconstructed pixels. Such difference values may be used in motion compensation for difference domain motion compensation.

For inter coding using difference domain, the current predicted block is determined based on the difference values between the corresponding predicted block samples in the enhancement layer reference picture and the corresponding predicted block samples in the scaled base layer reference picture. The difference values may be referred to as the difference predicted block. The co-located base layer reconstructed samples are added to the difference predicted block in order to obtain enhancement layer prediction samples.

However, using difference domain motion compensation in inter-layer prediction introduces two sets of motion estimation and motion compensation, since motion estimation and motion compensation are often used for both pixel domain and difference domain. Introducing two sets of motion estimation and motion compensation can lead to higher buffer and computational cost, which may not be practical for an encoder or a decoder. In addition, coding two sets of motion vectors may reduce coding efficiency since motion field may become irregular when the two sets of motion vectors have different properties and are interleaved at coding unit (CU) level. Moreover, motion estimation in difference domain requires that the base layer and enhancement layer share the same motion. Further, difference domain motion compensation does not work with single-loop decoding since the derivation of differential pictures between two layers is based on fully reconstructed pictures of each layer. Accordingly, it would be advantageous to avoid redundancy in having two sets of motion estimation and motion compensation when using difference domain motion compensation. Also, it would be advantageous to extend difference domain motion compensation in single-loop decoding.

The techniques described in this disclosure may address issues relating to inter-layer residual prediction and difference domain motion compensation in SVC. The techniques may be applied within a generalized residual prediction (GRP) framework. As explained above, inter-layer residual prediction uses the residue of the reference layer in predicting the current video unit, for example, a block or a frame. In generalized residual prediction, the inter-layer residual prediction of the current video unit may be based on the residue of the current layer, the temporal prediction of the current layer, and the residue of the reference layer. The residue of the reference layer may be adjusted by a weighting factor. The weighting factor may be based on and include various types of information. Examples of such information may include number of weighting candidates, weighting step, weighting index, and weighting table.

The GRP framework according to aspects of this disclosure may accommodate various types of residual prediction by incorporating a weighting factor. Adjusting the weighting factor appropriately may lead to significant coding gains for residual prediction. In addition, in the GRP framework, residual prediction may be performed using a reference layer that is not necessarily the base layer in traditional residual prediction. For example, the reference layer may be derived from the current enhancement layer. The GRP may also accommodate traditional residual prediction when the weighting factor is set to 1. The GRP framework may be used with both single-loop decoding and multi-loop decoding. In addition, in the GRP framework, motion estimation in difference domain may not be necessary, and therefore, the current layer and the enhancement layer do not have to share the same motion for motion estimation. The GRP framework can apply to many different types of residual prediction, and the traditional residual prediction as defined in Equation (1) and difference domain motion compensation are two specific scenarios of using the GRP framework. The techniques may improve the performance of motion compensation in scalable extension of HEVC and may also apply to 3D video coding extension of HEVC.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Video Encoding and Decoding System

FIG. 1 is a block diagram illustrating an example video encoding and decoding system that may utilize techniques in accordance with aspects described in this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device (not shown). Similarly, encoded data may be accessed from the storage device by input interface 28. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding a bitstream including video data conforming to multiple standards or standard extensions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for determining candidates for a candidate list for motion vector predictors for a current block may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission, direct wired communication, etc. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard, including but not limited to any of the standards listed above. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks may not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization is a broad term intended to have its broadest ordinary meaning. In one embodiment, quantization refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video Encoder

Figure 2:
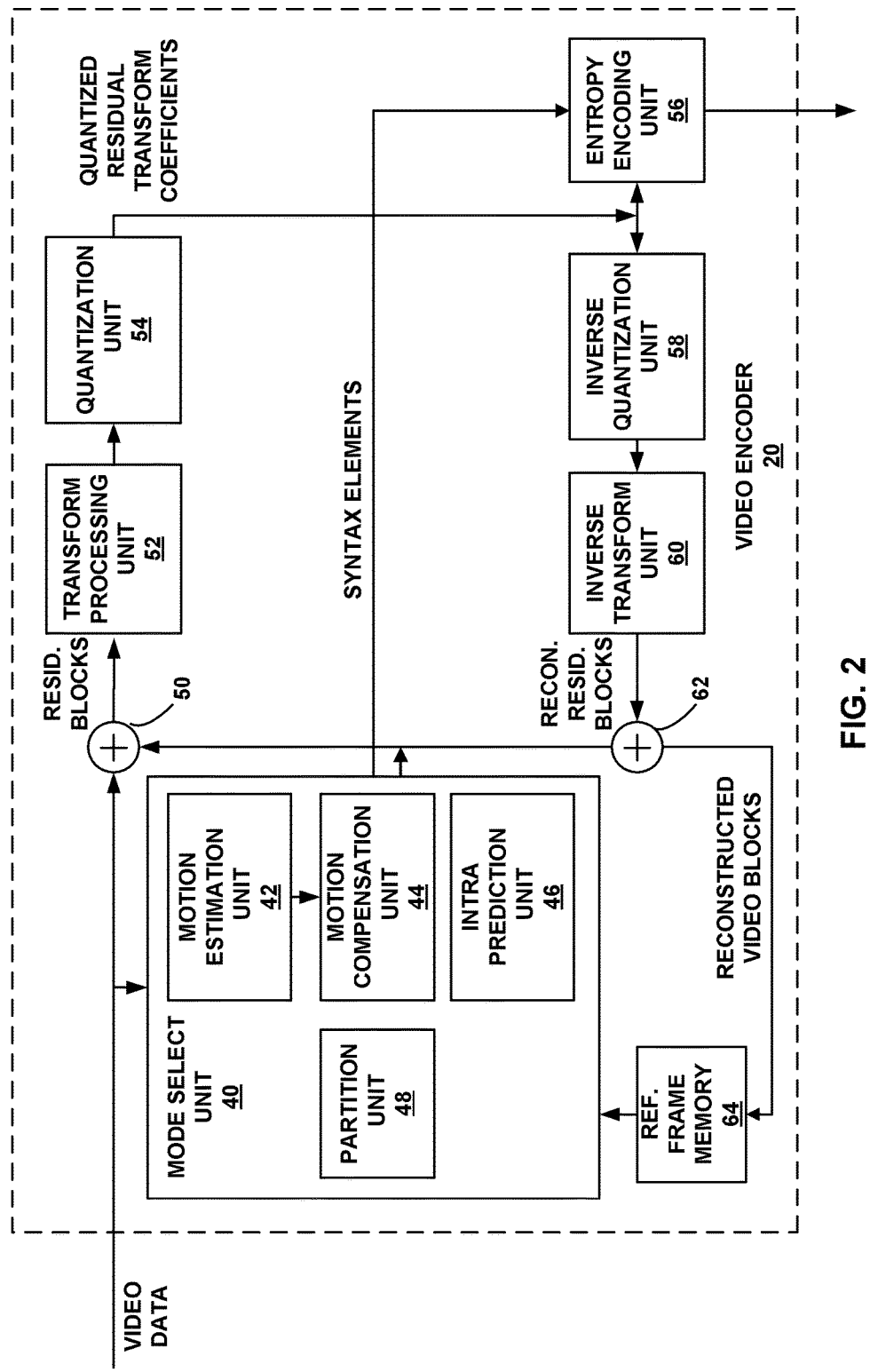
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. One or more of the units of the video encoder 20 may be configured to perform any or all of the techniques of this disclosure. As one example, transform processing unit 52 and inverse transform unit 60 may be configured to perform any or all of the adaptive transform techniques described in this disclosure, such as those described below with respect to FIG. 8. However, aspects of this disclosure are not so limited. In some examples, the techniques described in this disclosure may be shared among the various components of video encoder 20. In some examples, in addition to or instead of, a processor (not shown) may be configured to perform any or all of the techniques described in this disclosure.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict or calculate a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. The transform processing unit 52 may be configured to perform the adaptive transform method described below and with respect to FIG. 8.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. In the case of context-based entropy encoding, context may be based on neighboring blocks. Following the entropy encoding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. The inverse transform unit 60 may be configured to perform the adaptive transform method described below and with respect to FIG. 8.

Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Video Decoder

Figure 3:
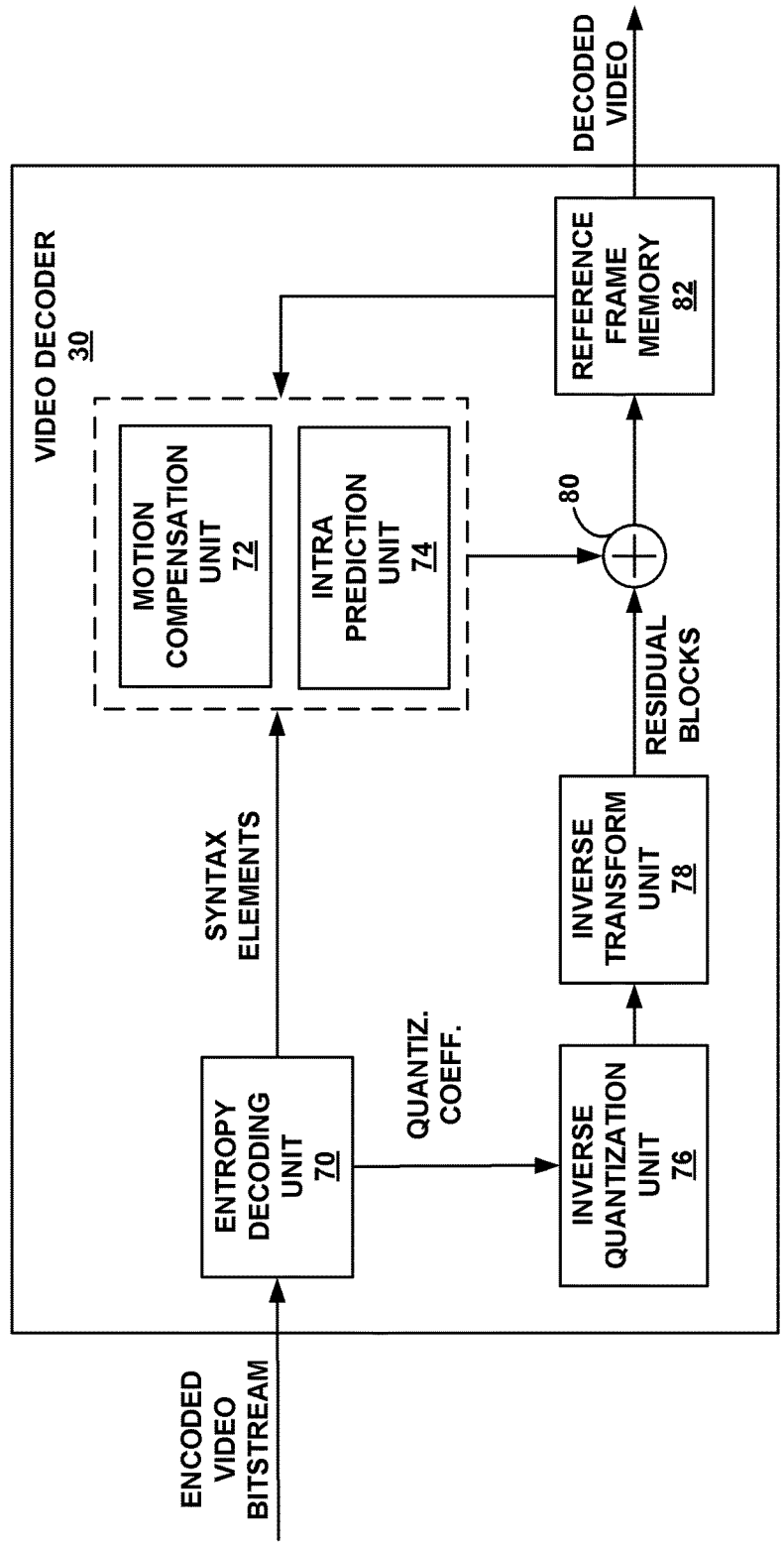
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. One or more of the units of video decoder 30 may be configured to perform any or all of the techniques of this disclosure. As one example, inverse transform unit 78 may be configured to perform any or all of the adaptive transform techniques described in this disclosure, such as those described below with respect to FIG. 8. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (e.g., see FIG. 1 and FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, e.g., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain. The inverse transform unit 78 may be configured to perform the adaptive transform method described below and with respect to FIG. 8.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference frame memory 82 also stores decoded video for later presentation on a display device, such as display device 32 of FIG. 1.

Scalable Video Coding (SVC)

Figure 4:
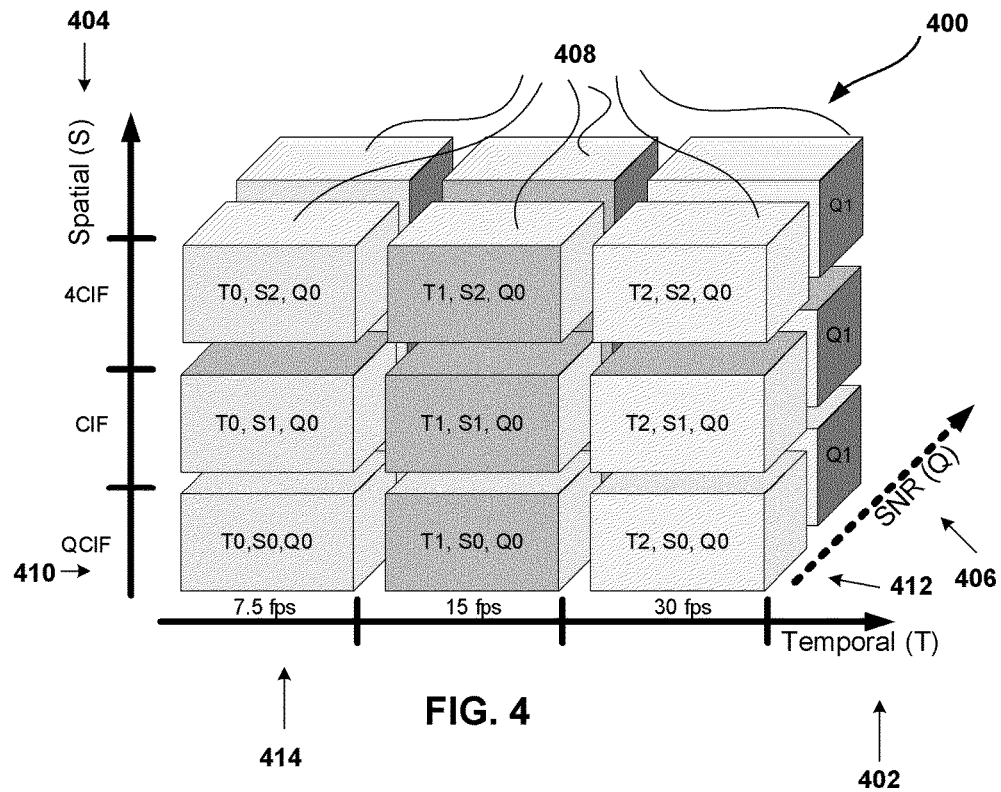
FIG. 4 is a block diagram illustrating an example of multi-dimensional scalabilities.

One example of multi-dimensional scalabilities 400 is shown in FIG. 4. In the illustrated embodiment, scalabilities are enabled in three dimensions: temporal 402 (or time), as shown along the x-axis; spatial 404, as shown along the y-axis; and quality 406, as shown along the z-axis. In the temporal 402, time dimension, frame rates having a variety of values, such as, but not limited to, 7.5 Hz, 15 Hz or 30 Hz, etc., can be supported by temporal scalability (T). When spatial scalability 404 (S) is supported, different resolutions such as QCIF, CIF and 4CIF, etc. are enabled. For each specific spatial resolution and frame rate, SNR (signal-to-noise ratio, or quality, Q) layers 406 can be added to improve the picture quality. Once video content has been encoded in such a scalable way, an extractor tool may be used to adapt the actual delivered content according to application requirements, which can be dependent on a variety of factors or parameters such as, for example, the clients and/or the transmission channel. In the example shown in FIG. 4, each cubic 408 contains the pictures with the same frame rate (temporal level), spatial resolution, and SNR layers. Better representation can be achieved by adding those cubes 408 (e.g., pictures) in any dimension 402, 404, 406. Combined scalability is supported when there are two, three or even more scalabilities enabled.

Pictures with the lowest spatial 410 and quality 412 layer are compatible with H.264/AVC. In general, the pictures at the lowest temporal level 414 form the temporal base layer. These lowest-temporal-level pictures can be enhanced with pictures at higher temporal levels. In addition to the H.264/AVC compatible layer, several spatial and/or SNR enhancement layers can be added to provide spatial and/or quality scalabilities. SNR scalability is also referred as quality scalability. Each spatial 404 or SNR 406 enhancement layer itself may be temporally scalable, with the same temporal scalability structure as the H.264/AVC compatible layer. For one spatial 404 or SNR 406 enhancement layer, the lower layer it depends on is also referred as the base layer of that specific spatial or SNR enhancement layer.

Figure 5:
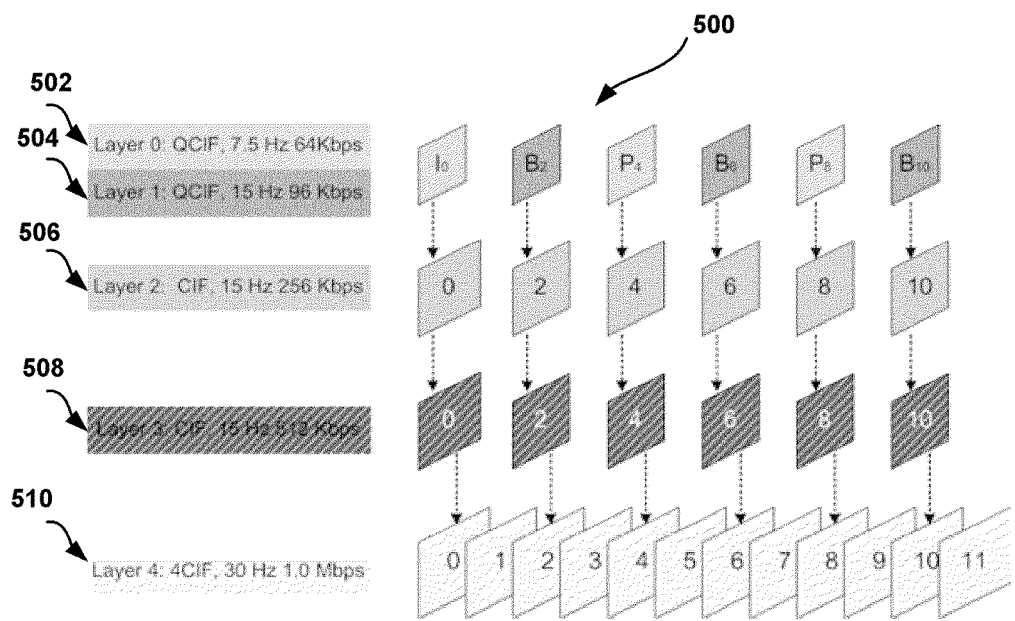
FIG. 5 is a block diagram of one embodiment of a SVC coding structure.

An example of SVC coding structure 500 is shown in FIG. 5. The pictures with the lowest spatial and quality layer (pictures in layer 0 502 and layer 1 504, with QCIF resolution) are compatible with H.264/AVC. Among them, those pictures of the lowest temporal level form the temporal base layer, as shown in layer 0 502 of FIG. 5. This temporal base layer (layer 0 502) can be enhanced with pictures of higher temporal levels (e.g., layer 1 504 through layer 4 510, etc.). In addition to the H.264/AVC compatible layer, several spatial and/or SNR enhancement layers can be added to provide spatial and/or quality scalabilities. For instance, the enhancement layer can be a CIF representation with the same resolution as layer 2 506. In the example, layer 3 508 is a SNR enhancement layer (CIF, 15 Hz, 512 Kbps). As shown in the example, each spatial or SNR enhancement layer itself may be temporally scalable, with the same temporal scalability structure as the H.264/AVC compatible layer.

In addition, an enhancement layer can enhance both spatial resolution and frame rate. For example, layer 4 510 provides a 4CIF enhancement layer, which further increases the frame rate from 15 Hz to 30 Hz.

Figure 6:
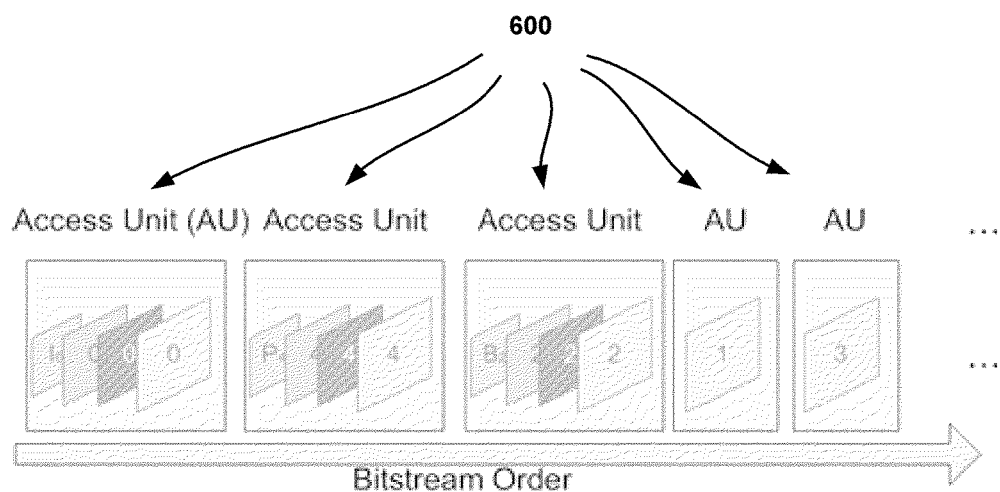
FIG. 6 is a block diagram illustrating one embodiment of a bitstream of coded slices forming various access units.

As shown in FIG. 6, the coded slices in the same time instance are successive in the bitstream order and form one access unit 600 (AU) in the context of SVC. Those SVC access units 600 then follow the decoding order, which could be different from the display order and decided, for example, by the temporal prediction relationship.

Transform

In one embodiment of video coding, an image block is first predicted using pixels in reconstructed temporally and/or spatially neighboring blocks. The prediction error (sometimes referred to as "residue") may then be transformed and quantized. For example, if S is a residue block of size N×N, the transformed block K can be derived using matrix multiplication as follows:

$$K = A * S * B$$

where K, A, and B are also of size N×N. A is the vertical transform matrix and B is the horizontal transform matrix. In some embodiments, A and B are the transpose of each other, (e.g., B=A' where "'" means transpose). In other embodiments, A and B are not the transpose of each other. When A and B are the transpose of each other, the previous equation becomes:

$$K = A * S * A'$$

Each transform (A and B) can include any of a variety of transforms. In some embodiments, the transform includes one of a discrete cosine transform (DCT), a discrete sine transform (DST), a Hadamard transform, a Haar transform, etc.

Intra BL Mode

Figure 7:
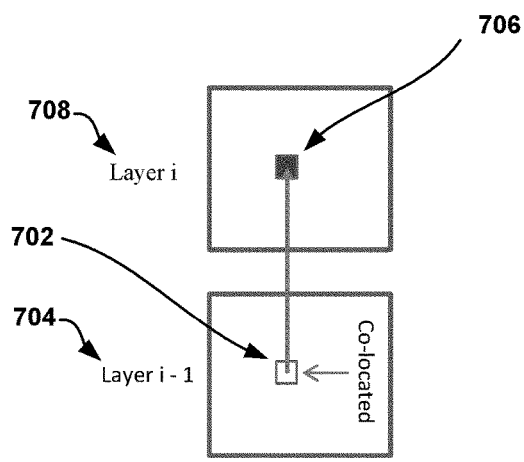
FIG. 7 is a block diagram illustrating one embodiment of a co-located block.

In scalable coding, there is a particular coding mode for an enhancement layer called the "Intra BL mode." In Intra BL mode, the texture in an enhancement layer block is predicted using the texture of the corresponding (sometimes referred to as "co-located", e.g., located at the same spatial location) blocks in base layer. One illustration of a corresponding or co-located block is illustrated in FIG. 7. A first block 702 is located in a lower-level layer, such as a base layer 704. A second block 706 is located in an enhancement layer 708 of the base layer 704. The second block 706 (sometimes referred to as the "current block," or the block that is currently being coded) is co-located with respect to the base layer block 702. The block 702 in the base layer 704 may be up-sampled if the enhancement layer 708 image has a larger or different size than the base layer 704 image. The prediction error (e.g., the residue) may be transformed, quantized and entropy encoded.

Transforming SVC Residue

As mentioned above, the residue of scalable video coding can have different energy distribution properties compared to non-SVC coding, due to inter-layer prediction (e.g., due to prediction in Intra BL mode). SVC residue is more noise-like, and the energy can spread over the whole or a larger frequency domain. As mentioned above, unlike non-SVC video coding, with SVC it is possible that HF components can have more energy than DC or LF components. Therefore, the traditional methods used for regular, non-SVC video coding may not work well for scalable video coding. A transform basis adjustment can help improve compression efficiency when implementing SVC.

Transform Matrix Adjustment

In one embodiment, a transform matrix A used for video coding is adaptively adjusted. H is the transform matrix after adjustment. Function F is used to define the adjustment process.

$$H=F(A)$$

Example 1

For example, the adjustment may include flipping the whole basis functions (e.g., reversing the order of all or some of the transform bases).

Example 1.a (Vertical Flipping, Row Swapping)

A is a 4×4 transform matrix, as follows:

$$A[4][4]=\{\{64,64,64,64\},\{83,36,-36,-83\},\\ \{64,-64,-64,64\},\{36,-83,83,-36\}\}$$

Each row is a transform basis function. The first (top) row is the transform basis corresponding to DC component. The subsequent rows are transform bases for higher frequency components (in increasing order and the last (bottom) row corresponding to the highest frequency component).

In this embodiment, F(A) is:

$$H[3-i][j]=A[i][j]; i=0, \ldots 3, j=0, \ldots 3,$$

and the transform matrix H after adjustment becomes:

$$H[4][4]=\{\{36,-83,83,-36\}\{64,-64,-64,64\},\\ \{83,36,-36,-83\},\{64,64,64,64\}\}$$

Example 1.b (Horizontal Flipping, Basis Element Swapping)

In this embodiment, F(A) is:

$$H[i][3-j]=A[i][j]; i=0, \ldots 3, j=0, \ldots 3$$

and the transform matrix H after adjustment becomes:

$$H[4][4]=\{\{64,64,64,64\},\{-83,-36,36,83\},\\ \{64,-64,-64,64\},\{-36,83,-83,36\}\}$$

Example 2

In this embodiment, the row i in H is the row i1 in A.

$$H[i][j]=A[i1][j]; i=0, \ldots 3, j=0, \ldots 3$$

The relationship between i and i1 may be defined using a function G:

$$i1=G(i).$$

Example 3, in this embodiment, the transform adjustment can be applied to only a subset of the transform bases. For example, for some values of i, i=G(i), e.g., these transform bases are at the same locations in both A and H.

Figure 8:
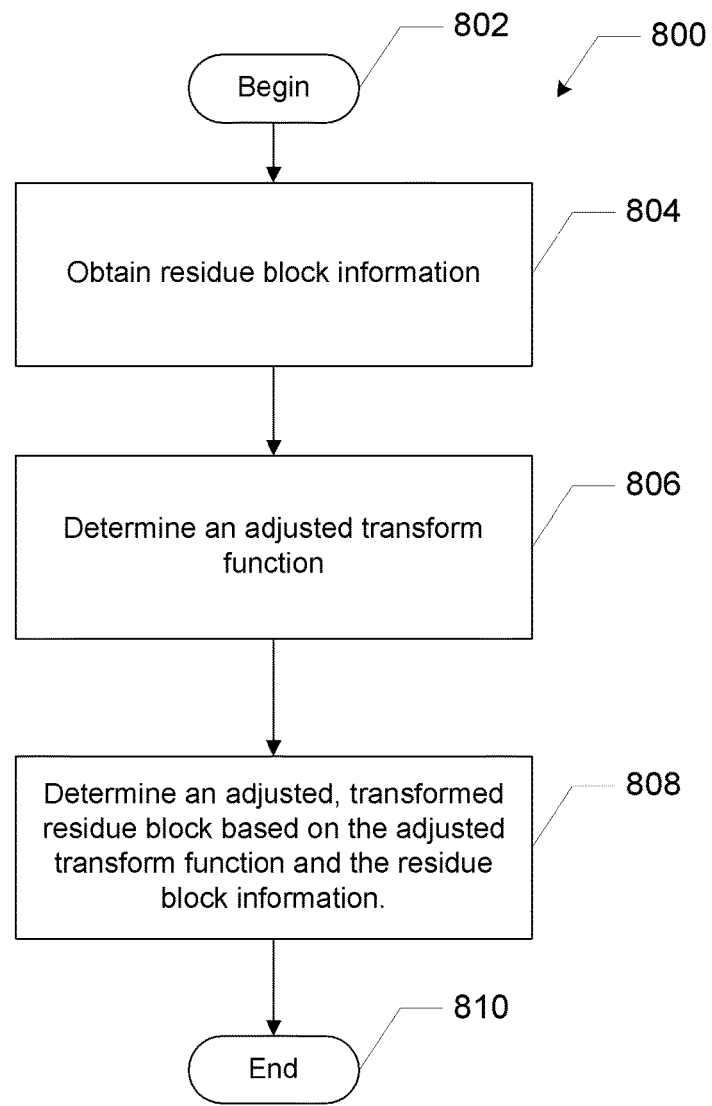
FIG. 8 is a flowchart of a method of transform basis adjustment.

FIG. 8 illustrates one embodiment of a method of adaptively adjusting a transform matrix used to transform a residual block, e.g., prior to quantization. The method 800 begins at block 802. At block 804, residue block information is obtained. For example, the residue may be determined using any of the techniques described above. At block 806 a transform function used to encode or decode the residual block is adjusted. The transform function may be adjusted according to any of the techniques described herein. For example, the transform function may be adjusted by vertical flipping, horizontal flipping, swapping rows swapping basis elements, etc. Transforming may also include inverse transforming.

At block 808 an adjusted, transformed, residue block is determined. The adjusted, transformed residue block is determined based on the adjusted transform function and the residue block. For example, the adjusted, transformed residue block may be referred to as a transform block. The method 800 ends at block 810.

The method 800 may be implemented by any of the coding devices described herein. For example, in one embodiment, the transform processing unit 52 and/or inverse transform unit 60 of the encoder 20 of FIG. 2 is configured to perform the method 500 to encode video data. In another embodiment, the inverse transform unit 78 of the decoder 30 of FIG. 3 is configured to perform the method 800 to inverse transform an encoded video bitstream.

In another embodiment, transform basis adjustment can be applied to a first transform (e.g., a horizontal transform), a second transform (e.g., the vertical transform), or both. The horizontal transform and the vertical transform (before adjustment) can each be a transpose of each other, or not. In one embodiment, the horizontal transform and the vertical transform are a discrete sine transform (DST) and its transposed version. In another embodiment, the horizontal transform is discrete cosine transform (DCT) and the vertical transform can be DST.

In another embodiment, the transform basis adjustment can be adaptively applied based on side information, or additional video information. For example, whether to apply a the transform adjustment and/or how to apply the transform adjustment (e.g., how F( ) and/or G( ) will be implemented), may be determined adaptively, such as based upon additional video information (e.g., side information).

The side information includes but is not limited to: CU mode, CU size, TU size, frame type, frame size, quantization parameter (QP), temporal layer, etc. The transform selection can be adaptively determined based on side information, such as, but not limited to: CU size, TU size, frame type, frame size, QP, temporal layer, parsed residue coefficients information (e.g., position of last non-zero coefficient, number of non-zero coefficients, amplitude of coefficients, etc.).

For example, in one embodiment, transform basis adjustment is enabled only for Intra BL mode. In another embodiment, transform basis adjustment is enabled only when the difference between the enhancement layer QP and the base layer QP are very close (e.g., the difference is smaller than a threshold). For example, in one non-limiting embodiment, the QP difference threshold is set to 6. If the difference between the enhancement layer QP and the base layer QP is equal to or smaller than 6, then transform basis adjustment is enabled. Other QP difference thresholds may be used. For example, in one embodiment, the QP difference threshold is in the range of 2 to 10. In another embodiment, transform basis adjustment is enabled only when both the above conditions are satisfied.

In another embodiment, whether and/or how to enable transform basis adjustment can also be based on information in a corresponding block (e.g., a co-located block) in a corresponding base layer, e.g., Blk_BL, etc. For example, whether and/or how to enable transform basis adjustment can be based on the pixel characteristics, e.g., pixel characteristics of Blk_BL. The pixel characteristics can be, for example, but not limited to, the direction of the texture, the amplitude of pixels, mean of pixel values, variance of pixel values, the gradient direction/value (e.g., of Blk_BL), etc. Other characteristics can be taken into account instead of or in addition to any one or more of these characteristics. For example, whether and/or how to enable transform basis adjustment can depend on the residue structure detected at the base layer for that location, the difference between the base layer and the prediction block, etc.

The selection of whether or how to perform transform basis adjustment can also be based on a coding mode (e.g., coding mode of Blk_BL), for example, whether Blk_BL is intra or inter or Skip mode, intra prediction, etc. The selection of whether or how to perform transform basis adjustment can also be derived by testing adjustment methods (including on/off decision) on Blk_BL and selecting the one that gives best performance (for example, best energy compaction property) at Blk_BL.

In one embodiment, the function, e.g., F( ), G( ), etc., or swapping to apply to the basis functions might depend on statistics collected in the current frame, or in previous frames. Whether and/or how to enable transform basis adjustment can be signaled by the encoder at the sequence parameter set (SPS), picture parameter set (PPS), slice header or at lower level, e.g., for each largest coding unit (LCU), coding unit (CU), prediction unit (PU) or transform unit (TU). The signaling can be the applied swapping or the difference with respect to the previous transform. Additionally, in some embodiments, the scan to be applied in the transform coefficient coding stage can depend on the basis functions.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to code video information, the apparatus comprising:
   a memory unit configured to store video information associated with a reference layer and a corresponding enhancement layer; and
   a processor in communication with the memory unit, the processor configured to:
      obtain residue block information based at least in part on the video information associated with the reference layer and the enhancement layer;
      determine an adjusted transform function as an output of an adjustment function when a difference between a QP of the enhancement layer and a QP of the reference layer is smaller than a predetermined threshold, wherein the output is determined by inputting a transform function associated with the video information to the adjustment function, wherein the transform function comprises a first transform matrix comprising two or more rows, wherein the adjustment function is configured to output the adjusted transform function by at least reversing an order of the two or more rows of the first transform matrix; and determine a transform block based on the adjusted transform function and the residue block information.

2. The apparatus of claim 1, wherein the transform function further comprises a second transform matrix, the second transform matrix comprising one or more rows, each row of the first transform matrix and the second transform matrix comprising one or more transform bases, wherein the processor is further configured to determine the adjusted transform function based on the first transform matrix and the second transform matrix.

3. The apparatus of claim 2, wherein the processor is further configured to determine the adjusted transform function by reversing an order of at least some of the transform bases in at least one row of the first transform matrix.

4. The apparatus of claim 2, wherein the first transform matrix, the second transform matrix, or both, corresponds to a transform selected from a group comprising a discrete cosine transform, a discrete sine transform, a Hadamard transform, and a Haar transform.

5. The apparatus of claim 2, wherein the first transform matrix is a transpose of the second transform matrix.

6. The apparatus of claim 1, wherein the processor is further configured to determine the adjustment function based on one or more of: a coding unit (CU) mode, a CU size, a transform unit (TU) size, a frame type, a frame size, a QP, a temporal layer, or parsed residue coefficients information.

7. The apparatus of claim 1, wherein the processor is further configured to determine whether to apply the adjustment function based on one or more of: a coding unit (CU) mode, a CU size, a transform unit (TU) size, a frame type, a frame size, a QP, a temporal layer, or parsed residue coefficients information.

8. The apparatus of claim 7, wherein said parsed residue coefficients information is selected from a group comprising one or more of: a position of a last non-zero coefficient, a number of non-zero coefficients, and an amplitude of one or more coefficients.

9. The apparatus of claim 1, wherein the processor is further configured to apply the adjustment function only when intra BL mode is enabled.

10. The apparatus of claim 1, wherein the processor is further configured to encode the video information using the transform block.

11. The apparatus of claim 1, wherein the processor is further configured to decode the video information using the transform block.

12. The apparatus of claim 1, wherein the apparatus is selected from a group comprising one or more of: a desktop computer, a notebook computer, a laptop computer, a tablet computer, a set-top box, a telephone handset, a smart phone, a smart pad, a television, a camera, a display device, a digital media player, a video gaming console, or a video streaming device.

13. The apparatus of claim 1, wherein the predetermined QP threshold is in the range of 2 to 10.

14. A method of decoding video information, the method comprising:
storing video information associated with a reference layer and a corresponding enhancement layer;
obtaining residue block information based at least in part on the video information associated with the reference layer and the enhancement layer;
determining an adjusted transform function as an output of an adjustment function when a difference between a QP of the enhancement layer and a QP of the reference layer is smaller than a predetermined threshold, wherein the output is determined by inputting a transform function associated with the video information to the adjustment function, wherein the transform function comprises a first transform matrix comprising two or more rows, wherein the adjustment function is configured to output the adjusted transform function by at least reversing an order of the two or more rows of the first transform matrix;
determining a transform block based on the adjusted transform function and the residue block information; and
decoding the video information using the transform block.

15. The method of claim 14, wherein the transform function further comprises a second transform matrix, the second transform matrix comprising one or more rows, each row of the first transform matrix and the second transform matrix comprising one or more transform bases, wherein the method further comprises determining the adjusted transform function based on the first transform matrix and the second transform matrix.

16. The method of claim 15, further comprising determining the adjusted transform function by reversing an order of at least some of the transform bases in at least one row of the first transform matrix.

17. The method of claim 15, wherein the first transform matrix, the second transform matrix, or both, corresponds to a transform selected from a group comprising a discrete cosine transform, a discrete sine transform, a Hadamard transform, and a Haar transform.

18. The method of claim 15, wherein the first transform matrix is a transpose of the second transform matrix.

19. The method of claim 14, further comprising determining the adjustment function based on at least one of a coding unit (CU) mode, a CU size, a transform unit (TU) size, a frame type, a frame size, a QP, a temporal layer, or parsed residue coefficients information.

20. The method of claim 14, further comprising determining whether to apply the adjustment function based on one or more of: a coding unit (CU) mode, a CU size, a transform unit (TU) size, a frame type, a frame size, a QP, a temporal layer, or parsed residue coefficients information.

21. The method of claim 20, wherein said parsed residue coefficients information is selected from a group comprising one or more of: a position of a last non-zero coefficient, a number of non-zero coefficients, and an amplitude of one or more coefficients.

22. The method of claim 14, further comprising applying the adjust ent function only when intra BL mode is enabled.

23. A method of encoding video information, the method comprising:
storing video information associated with a reference layer and a corresponding enhancement layer,
obtaining residue block information based at least in part on the video information associated with the reference layer and the enhancement layer;
determining an adjusted transform function as an output of an adjustment function when a difference between a QP of the enhancement layer and a QP of the reference layer is smaller than a predetermined threshold, wherein the output is determined by inputting a transform function associated with the video information to the adjustment function, wherein the transform function comprises a first transform matrix comprising two or more rows, wherein the adjustment function is configured to output the adjusted transform function by at least reversing an order of the two or more rows of the first transform matrix;
determining a transform block based on the adjusted transform function and the residue block information; and
encoding the video information using the transform block.

24. The method of claim 23, wherein the transform function further comprises a second transform matrix, the second transform matrix comprising one or more rows, each row of the first transform matrix and the second transform matrix comprising one or more transform bases, wherein the method further comprises determining the adjusted transform function based on the first transform matrix and the second transform matrix.

25. The method of claim 24, further comprising determining the adjusted transform function by reversing an order of at least some of the transform bases in at least one row of the first transform matrix.

26. The method of claim 24, wherein the first transform matrix, the second transform matrix, or both, corresponds to a transform selected from a group comprising a discrete cosine transform, a discrete sine transform, a Hadamard transform, and a Haar transform.

27. The method of claim 24, wherein the first transform matrix is a transpose of the second transform matrix.

28. The method of claim 23, further comprising determining the adjustment function based on at least one of a coding unit (CU) mode, a CU size, a transform unit (TU) size, a frame type, a frame size, a QP, a temporal layer, or parsed residue coefficients information.

29. The method of claim 23, further comprising determining whether to apply the adjustment function based on one or more of: a coding unit (CU) mode, a CU size, a transform unit (TU) size, a frame type, a frame size, a QP, a temporal layer, or parsed residue coefficients information.

30. The method of claim 29, wherein said parsed residue coefficients information is selected from a group comprising one or more of: a position of a last non-zero coefficient, a number of non-zero coefficients, and an amplitude of one or more coefficients.

31. The method of claim 23, further comprising applying the adjustment function only when intra BL mode is enabled.

32. An apparatus for coding video information, the apparatus comprising:
means for storing video information associated with a reference layer and a corresponding enhancement layer;
means for obtaining residue block information based at least in part on the video information associated with the reference layer and the enhancement layer;
means for determining an adjusted transform function as an output of an adjustment function when a difference between a QP of the enhancement layer and a QP of the reference layer is smaller than a predetermined threshold, wherein the output is determined by inputting a transform function associated with the video information to the adjustment function, wherein the transform function comprises a first transform matrix comprising two or more rows, wherein the adjustment function is configured to output the adjusted transform function by at least reversing an order of the two or more rows of the first transform matrix; and
means for determining a transform block based on the adjusted transform function and the residue block information.

33. The apparatus of claim 32, further comprising means for determining the adjustment function based on at least one of a coding unit (CU) mode, a CU size, a transform unit (TU) size, a frame type, a frame size, a QP, a temporal layer, or parsed residue coefficients information.

34. The apparatus of claim 32, further comprising determining whether to apply the adjustment function based on one or more of: a coding unit (CU) mode, a CU size, a transform unit (TU) size, a frame type, a frame size, a QP, a temporal layer, or parsed residue coefficients information.

35. The apparatus of claim 32, further comprising means for applying the adjustment function only when intra BL mode is enabled.

36. A non-transitory computer readable medium having computer executable instructions that when executed by a computing device causes the computing device to:
store video information associated with a reference layer and a corresponding enhancement layer;
obtain residue block information based at least in part on the video information associated with the reference layer and the enhancement layer;
determine an adjusted transform function as an output of an adjustment function when a difference between a QP of the enhancement layer and a QP of the reference layer is smaller than a predetermined threshold, wherein the output is determined by inputting a transform function associated with the video information to the adjustment function, wherein the transform function comprises a first transform matrix comprising two or more rows, wherein the adjustment function is configured to output the adjusted transform function by at least reversing an order of the two or more rows of the first transform matrix; and
determine a transform block based on the adjusted transform function and the residue block information.

37. The non-transitory computer readable medium of claim 36, wherein the computer executable instructions further cause the computing device to determine the adjustment function based on one or more of: a coding unit (CU) mode, a CU size, a transform unit (TU) size, a frame type, a frame size, a QP, a temporal layer, or parsed residue coefficients information.

38. The non-transitory computer readable medium of claim 36, wherein the computer executable instructions further cause the computing device to determine whether to apply the adjustment function based on one or more of: a coding unit (CU) mode, a CU size, a transform unit (TU) size, a frame type, a frame size, a QP, a temporal layer, and parsed residue coefficients information.

39. The non-transitory computer readable medium of claim 36, wherein the computer executable instructions further cause the computing device to apply the adjustment function only when intra BL mode is enabled.

* * * * *